(12) United States Patent
Morin et al.

(10) Patent No.: US 8,065,624 B2
(45) Date of Patent: Nov. 22, 2011

(54) VIRTUAL KEYPAD SYSTEMS AND METHODS

(75) Inventors: Philippe Morin, Goleta, CA (US); David Kryze, Campbell, CA (US); Luca Rigazio, San Jose, CA (US); Peter Veprek, San Jose, CA (US)

(73) Assignee: Panasonic Corporation, Osaka (JP)

( * ) Notice: Subject to any disclaimer, the term of this patent is extended or adjusted under 35 U.S.C. 154(b) by 807 days.

(21) Appl. No.: 11/977,346

(22) Filed: Oct. 24, 2007

(65) Prior Publication Data
US 2009/0007001 A1    Jan. 1, 2009

Related U.S. Application Data

(60) Provisional application No. 60/946,858, filed on Jun. 28, 2007.

(51) Int. Cl.
*G06F 3/048* (2006.01)
(52) U.S. Cl. ......... 715/773; 715/805; 715/816; 715/864
(58) Field of Classification Search .................. 715/773, 715/805, 816, 864; 345/156, 168, 169, 173; 455/151.1
See application file for complete search history.

(56) References Cited

U.S. PATENT DOCUMENTS

| | | | |
|---|---|---|---|
| 5,038,401 A | | 8/1991 | Inotsume |
| 5,128,672 A | * | 7/1992 | Kaehler ........................... 341/23 |
| 5,652,630 A | | 7/1997 | Bertram et al. |
| 5,724,106 A | | 3/1998 | Autry et al. |
| 5,936,614 A | * | 8/1999 | An et al. ........................ 345/173 |
| 5,963,671 A | | 10/1999 | Comerford et al. |
| 6,359,270 B1 | | 3/2002 | Bridson |
| 6,396,523 B1 | | 5/2002 | Segal et al. |
| 6,692,170 B2 | | 2/2004 | Abir |
| 6,765,557 B1 | | 7/2004 | Segal et al. |
| 7,002,553 B2 | | 2/2006 | Shkolnikov |
| 7,020,270 B1 | | 3/2006 | Ghassabian |
| 7,098,896 B2 | | 8/2006 | Kushler et al. |
| 7,139,983 B2 | | 11/2006 | Kelts |
| 7,202,853 B2 | | 4/2007 | Ng et al. |
| 7,372,454 B2 | | 5/2008 | Betts-LaCroix |
| 7,382,358 B2 | | 6/2008 | Kushler et al. |
| 7,453,439 B1 | | 11/2008 | Kushler et al. |
| 7,539,472 B2 | * | 5/2009 | Sloo ........................... 455/151.1 |
| 7,542,029 B2 | | 6/2009 | Kushler |
| 7,649,478 B1 | * | 1/2010 | Yoon ............................... 341/22 |

(Continued)

FOREIGN PATENT DOCUMENTS

JP    08-221169 A    8/1996

(Continued)

*Primary Examiner* — Ba Huynh
(74) *Attorney, Agent, or Firm* — Harness, Dickey & Pierce, P.L.C.

(57) ABSTRACT

Accordingly, a virtual keypad system for inputting text is provided. A virtual keypad system includes a remote controller having at least one touchpad incorporated therein and divided into a plurality of touch zones. A display device is in data communication with the remote controller and is operable to display a user interface including a keypad, where each key of the keypad is mapped to a touch zone of the touchpad. A prediction module, in response to an operator pressing a given touch zone to select a particular character, performs one or more key prediction methods to predict one or more next plausible keys. A key mapping module remaps the touch zones of the touchpad to the keys of the keypad based on the one or more next plausible keys.

1 Claim, 12 Drawing Sheets

U.S. PATENT DOCUMENTS

| | | |
|---|---|---|
| 7,737,999 B2 * | 6/2010 | Ardhanari et al. ............ 345/685 |
| 7,869,832 B2 * | 1/2011 | Griffin .......................... 455/566 |
| 2002/0093535 A1 | 7/2002 | Murphy |
| 2002/0122197 A1 * | 9/2002 | Abir ............................ 358/1.11 |
| 2002/0149569 A1 | 10/2002 | Dutta et al. |
| 2003/0080945 A1 | 5/2003 | Betts-LaCroix |
| 2003/0193478 A1 * | 10/2003 | Ng et al. ....................... 345/168 |
| 2003/0197736 A1 * | 10/2003 | Murphy ......................... 345/780 |
| 2004/0041723 A1 | 3/2004 | Shibamiya et al. |
| 2004/0080487 A1 * | 4/2004 | Griffin et al. ................. 345/156 |
| 2004/0140956 A1 * | 7/2004 | Kushler et al. ............... 345/168 |
| 2004/0169635 A1 | 9/2004 | Ghassabian |
| 2005/0052406 A1 | 3/2005 | Stephanick et al. |
| 2005/0141770 A1 * | 6/2005 | Marila et al. ................. 382/230 |
| 2005/0162402 A1 | 7/2005 | Watanachote |
| 2005/0195159 A1 | 9/2005 | Hunleth et al. |
| 2005/0253814 A1 | 11/2005 | Ghassabian |
| 2006/0119588 A1 * | 6/2006 | Yoon et al. ................... 345/173 |
| 2006/0152496 A1 * | 7/2006 | Knaven ........................ 345/172 |
| 2006/0197750 A1 | 9/2006 | Kerr et al. |
| 2006/0227032 A1 | 10/2006 | Vidal |
| 2006/0238510 A1 | 10/2006 | Panotopoulos et al. |
| 2007/0040813 A1 | 2/2007 | Kushler et al. |
| 2007/0046641 A1 * | 3/2007 | Lim .............................. 345/173 |
| 2007/0060176 A1 | 3/2007 | Sloo |
| 2007/0061754 A1 * | 3/2007 | Ardhanari et al. ............ 715/816 |
| 2007/0079239 A1 * | 4/2007 | Ghassabian ................... 715/707 |
| 2007/0132887 A1 | 6/2007 | Boyden |
| 2007/0182595 A1 | 8/2007 | Ghassabian |
| 2007/0188472 A1 | 8/2007 | Ghassabian |
| 2008/0007434 A1 * | 1/2008 | Hristov .......................... 341/22 |
| 2008/0316212 A1 | 12/2008 | Kushler |
| 2009/0037623 A1 | 2/2009 | Ghassabian |
| 2009/0146848 A1 | 6/2009 | Ghassabian |
| 2009/0199092 A1 | 8/2009 | Ghassabian |

FOREIGN PATENT DOCUMENTS

JP  09-251347  9/1997

* cited by examiner

VIRTUAL KEYPAD SYSTEMS AND METHODS

CROSS-REFERENCE TO RELATED APPLICATIONS

This application claims the benefit of U.S. Provisional Application No. 60/946,858, filed on Jun. 28, 2007. The disclosure of the above application is incorporated herein by reference.

FIELD

The present invention relates to methods and systems for recognizing text input from a remote controller.

BACKGROUND

Many electronic consumer products come with remote control devices. These remote control devices can communicate a variety of commands to the electronic product. With the rise in technological advancements to the electronic products, the remote control devices have become complex to operate. For example, modern television remote controls can include selection buttons for volume, channel selection, menu selection, and picture viewing. To operate the remote control, the user must take time away from the program he or she is watching to focus in on the buttons. This can be very distracting to a viewer.

In addition, many internet based services such as online shopping are now being provided through the television. Additional selection buttons such as keypad buttons must be included on the remote control device to accommodate these new services. The new selection buttons serve to increase the complexity as well as the cost of the remote control devices.

The statements in this section merely provide background information related to the present disclosure and may not constitute prior art.

SUMMARY

A virtual keypad system for inputting text is provided. A virtual keypad system includes a remote controller having at least one touchpad incorporated therein and divided into a plurality of touch zones. A display device is in data communication with the remote controller and is operable to display a user interface including a keypad, where each key of the keypad is mapped to a touch zone of the touchpad. A prediction module, in response to an operator pressing a given touch zone to select a particular character, performs one or more key prediction methods to predict one or more next plausible keys. A key mapping module remaps the touch zones of the touchpad to the keys of the keypad based on the one or more next plausible keys.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present teachings in any way.

DETAILED DESCRIPTION

The following description is merely exemplary in nature and is not intended to limit the present teachings, their application, or uses. It should be understood that throughout the drawings, corresponding reference numerals indicate like or corresponding parts and features. As used herein, the term module or sub-module can refer to a processor (shared, dedicated, or group) and memory that executes one or more software or firmware programs, and/or other suitable components that can provide the described functionality and/or combinations thereof.

Figure 1:
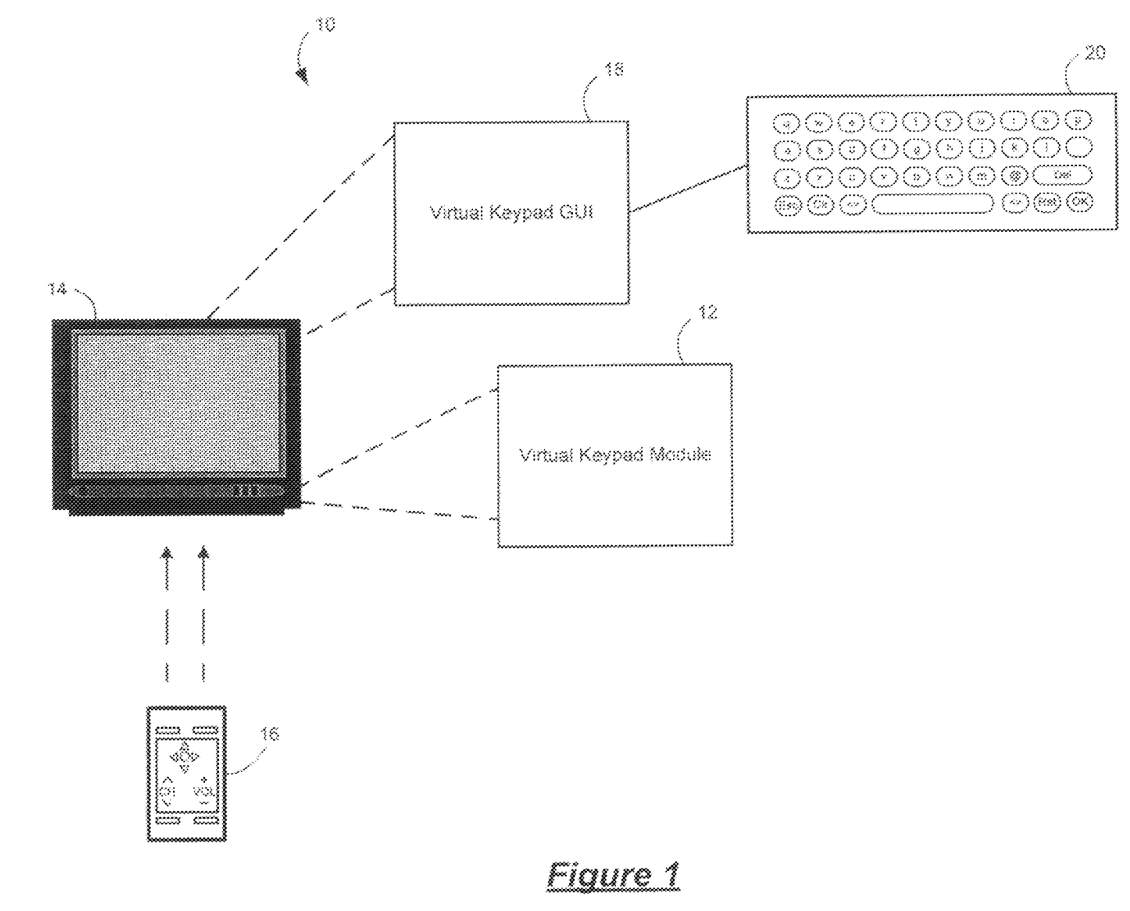
FIG. 1 is an illustration of a text input system according to various aspects of the present disclosure.

Referring now to FIG. 1, FIG. 1 depicts an exemplary text input system 10 implemented according to various aspects of the present disclosure. The exemplary text input system 10 includes a virtual keypad module 12 that facilitates the input of alphanumeric characters by a user for interacting with various services delivered through a display device 14. The display device 14 can be, but is not limited to, a television (as shown), a projector and screen, or a computer. The services can be, for example, internet based services such as, online shopping and movie subscriptions. The virtual keypad module 12 provides feedback to the user via a graphical user interface (GUI) 18. The GUI 18 includes a virtual keypad 20, as will be discussed in more detail below.

In various embodiments, the virtual keypad module 12 can be implemented within the display device 14. In various other embodiments, the virtual keypad module 12 can be implemented separate from the display device 14 (such as, for example, on a set top box (not shown)) and can be in data communication with the display device 14. For ease of the discussion, the remainder of the disclosure will be discussed in the context of the virtual keypad module 12 being implemented within the display device 14.

The text input system 10 further includes a remote controller 16 that generates one or more signals to the display device 14 in response to user input. The virtual keypad module 12 receives and processes the signals. Based on the signals, the virtual keypad module 12 determines an orientation and a holding position of the remote controller 16, recognizes text input, and/or provides visual feedback to the user via a graphical user interface (GUI) 18. In particular, the virtual keypad module 12 implements selection auto-correction methods that compensate for human typing (i.e., clicking) error. For example, when attempting to input text quickly, users can typically undershoot or overshoot the location and click on a nearby unintended key. The virtual keypay module 12 employs a combination of prediction and auto-correction methods to determine which character(s) is/are most likely to be entered by the user.

In one example, provided fast input speeds, a prediction method is used to compensate for the possible overshoot and undershoot. As will be discussed in more detail below, the predictions can be used to enlarge an activation area of possible keys while reducing (or zero-ing) activation areas of keys that are not in the next-character prediction list. However, if the prediction methods are unable to generate a prediction, even at fast input speeds, the virtual keypad module 12 disables the selection auto-correction methods and reverts to a default mode (i.e., without enlarging or reducing the activation area ). The virtual keypad module 12 can also disable the selection auto-correction method when the interaction becomes slow because it is assumed that clicking errors do not generally occur during slow interaction.

Figure 2A:
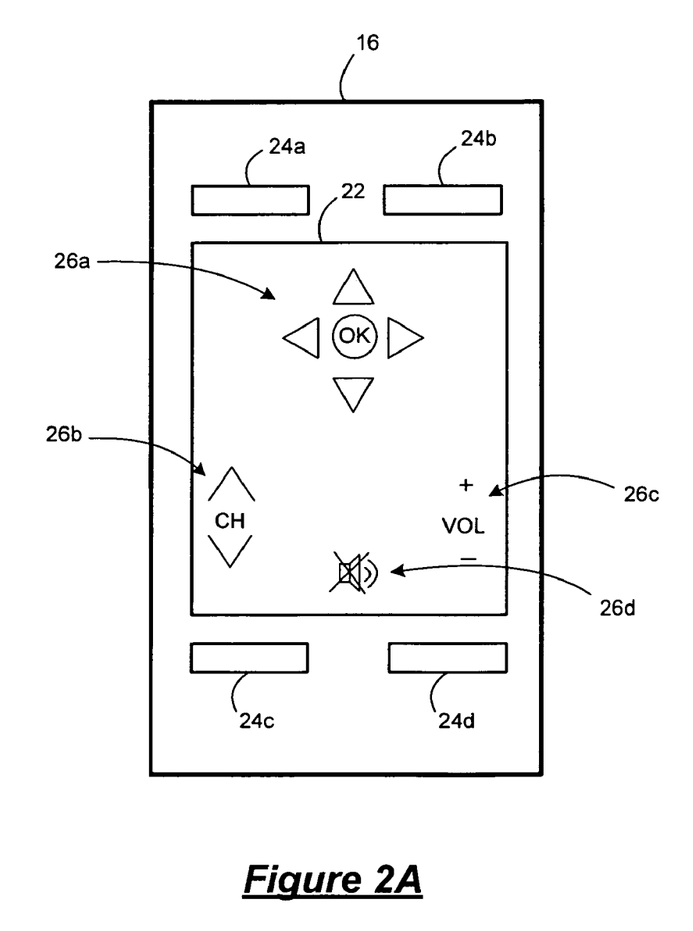
FIG. 2A is an illustration of a remote controller of the text input system of FIG. 1 that includes a touchpad according to various aspects of the present disclosure.
Figure 2B:
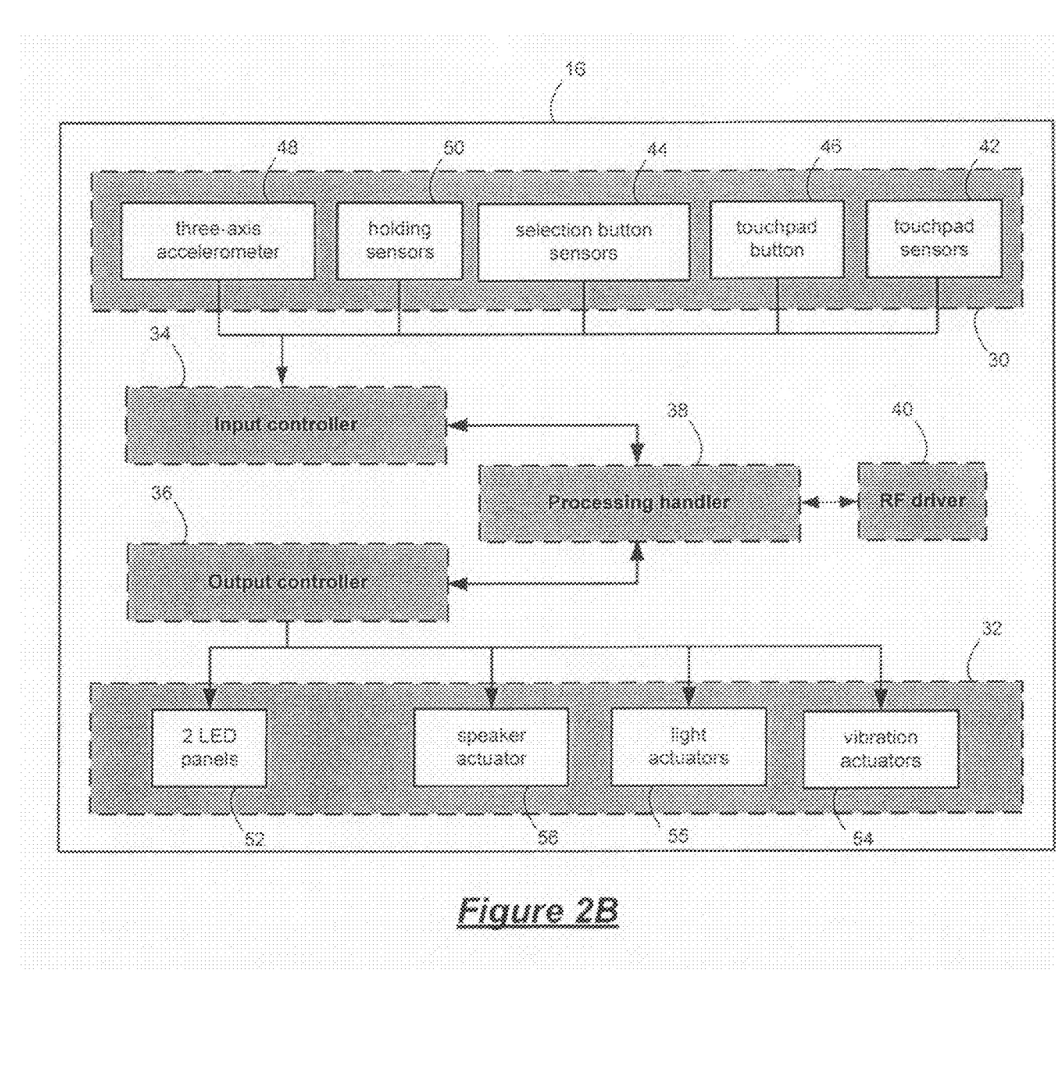
FIG. 2B is a block diagram illustrating internal components of the remote controller of FIG. 2A according to various aspects of the present disclosure.

FIGS. 2A and 2B illustrate an exemplary remote controller 16 according to various aspects of the present disclosure. As shown in FIG. 2A, the exterior of the remote controller 16 includes a touchpad 22 and one or more soft keys 24a-24d. In various embodiments, touch zones defined by one or more coordinates of the touchpad 22 can be mapped to a particular key of the virtual keypad 20 (FIG. 1).

A user can select a particular key of the virtual keypad 20 by gently placing his finger or thumb on the touchpad 22 at or near the associated touch zone (FingerDown event), by dragging a finger or thumb along the touchpad 22 to the associated touch zone (FingerDrag event), and/or by lifting the finger or thumb away from the touchpad 22 (FingerUp event). While the user has a finger or thumb on the touchpad 22 (i.e., between FingerDown and FingerUp events), the user can click on the touchpad 22 by applying greater force (FingerPress event) followed by releasing the force (FingerRelease event) to select a key.

In various other embodiments, a relative access method can be used as an alternative or as a secondary method for selecting keys. The relative access method assumes a position of the user's finger or thumb to be a current coordinate or touch zone of the touchpad 22. Subsequent gestures by the user are then interpreted relative to that coordinate or touch zone. This allows for an adjustable precision in selection.

Important functions of the remote controller 16 (such as, for example, volume, channel, and mute) can be associated with specific selection buttons 26a-26d of the touchpad 22. The selection buttons 26a-26d can be designated by a specific touchpad button that is painted or illuminated on the touchpad 22 (as shown) or by a button displayed on an overlay to the virtual keypad 20 (FIG. 1) of the GUI 18 (FIG. 1). This allows the user to use the remote controller 16 in complete darkness without having to look away from the content being displayed on the display device 14 (FIG. 1).

The functions can be controlled by simply touching the buttons or be controlled by performing a specific gesture. In one example, sliding a finger or thumb up or down on the right side of the touchpad 22 can trigger a volume up or volume down action. In another example, sliding a finger or thumb right or left on the top side of the touchpad 22 can trigger a channel up or channel down action.

In various embodiments, the body of the remote controller 16 can be made of a soft material, allowing the remote controller 16 to be squeezed. The squeezing of the remote controller 16 can be performed by the user to trigger certain actions, particularly in contexts where the GUI 18 (FIG. 1) is just waiting for an acknowledgement without proposing a choice (such as a "next" button in a slideshow).

As shown in FIG. 2B, the internal components of the remote controller 16 can include, but are not limited to, input sensors 30, output actuators 32, an input controller 34, an output controller 36, a process handler 38, a wireless transmitter (e.g., RF, Bluetooth, etc.) 40, and/or combinations thereof. The inputs sensors 30 can include touchpad sensors 42. The touchpad sensors 42 can be single-position registering touchpad sensors mounted side-by-side that allow for the selection of at least two contact points on the touchpad 22 (FIG. 2A) simultaneously. Alternatively, the touchpad sensors 42 can be a single multi-touch capable touchpad sensor that can register, with equal precision, two points of contact at the same time. In various embodiments, the touchpad sensors 42 can register pressure information to allow the touchpad 22 (FIG. 2A) to be clickable.

The input sensors 30 can also include one or more selection button sensors 44, one or more touchpad button sensors 46, one or more accelerometers 48, and one or more holding sensors 50. The holding sensors 50 can be, for example, capacitive sensors that are located around the border of the remote controller 16, and/or behind the remote controller 16. The holding sensors 50 indicate whether the user is touching an area of the remote controller 16 in a proximity of the holding sensor 50. The accelerometer 48 can be a three-axis accelerometer that indicates a positioning of the remote controller 16. The input controller 34 reads the real-time data from all active sensors. In various embodiments, some sensors may not be active at all times to reduce power consumption. The process handler 38 gathers and forms into packets the data to be transmitted and/or processes the real-time data from one or more active sensors to perform local actions. The RF transmitter 40 generates the signals in packet form to the display device 14 (FIG. 1).

The output actuators 32 can include one or more LED panels 52 for displaying the touchpad buttons 26a-26d, depending on the specific state of interaction with the GUI present on-screen. The output actuators 32 can additionally or alternatively include actuators for providing sufficient haptic feedback to the user (such as, for example, vibration actuators 54, light actuators 55, and/or sound actuators 56). The output controller 36 updates the state of all the active actuators.

Figure 3:
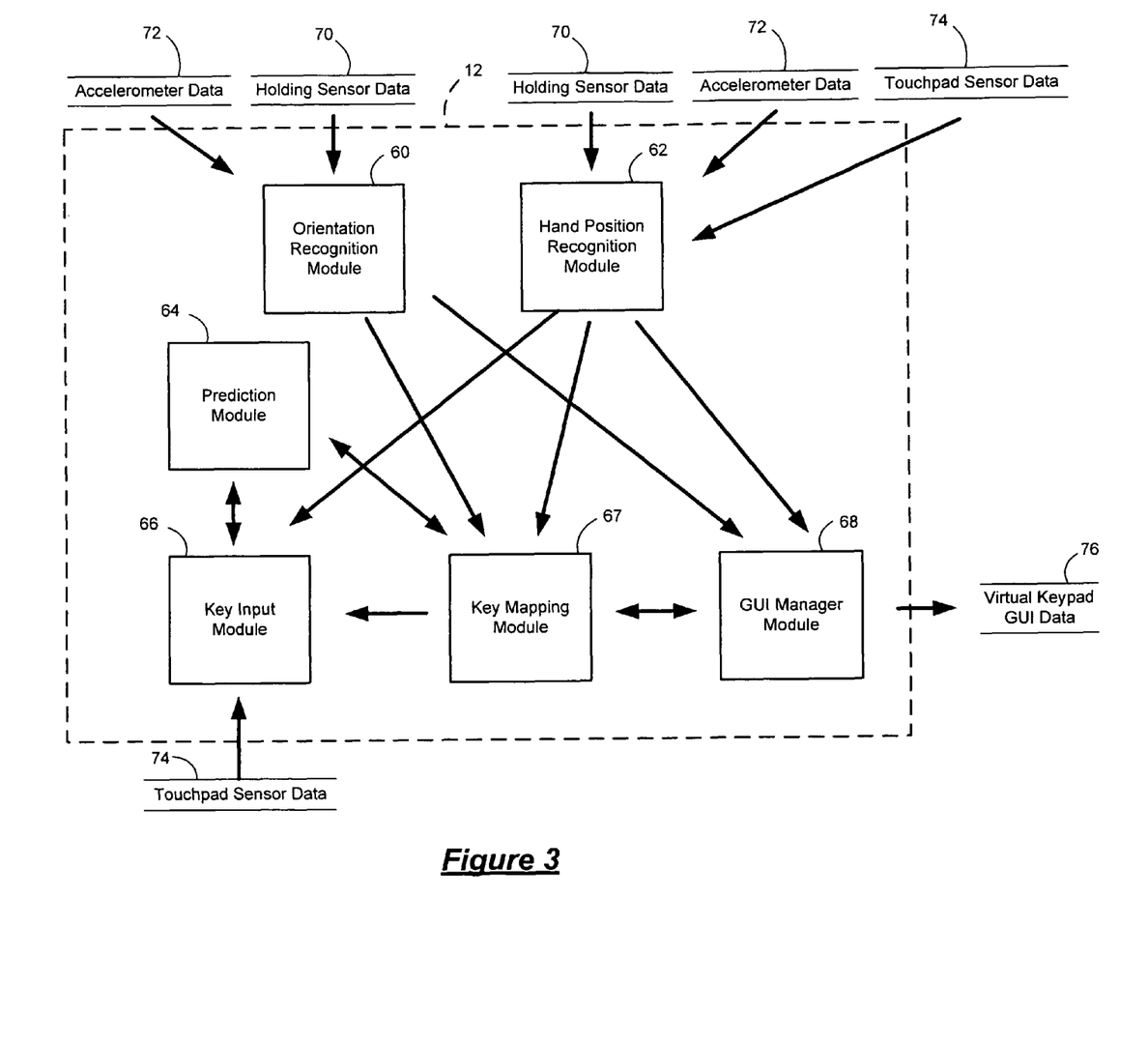
FIG. 3 is a dataflow diagram illustrating a virtual keypad module of the text input system of FIG. 1 according to various aspects of the present disclosure.
Figure 4A:
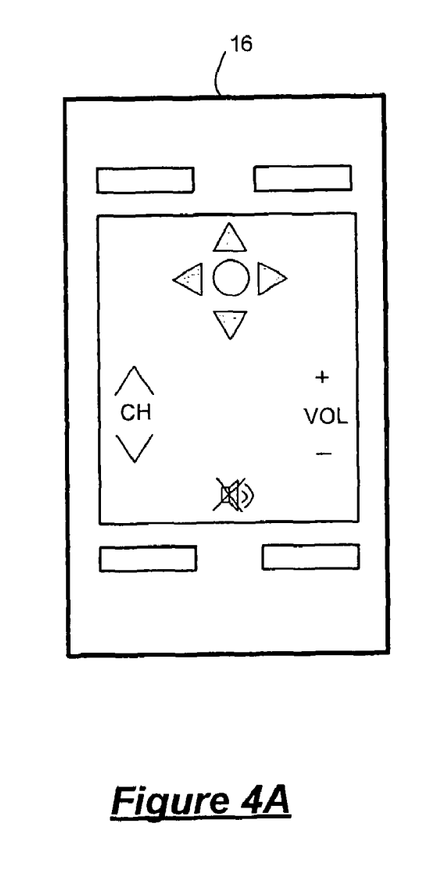
FIG. 4A is an illustration of the remote controller being held in a portrait position according to various aspects of the present disclosure.
Figure 4B:
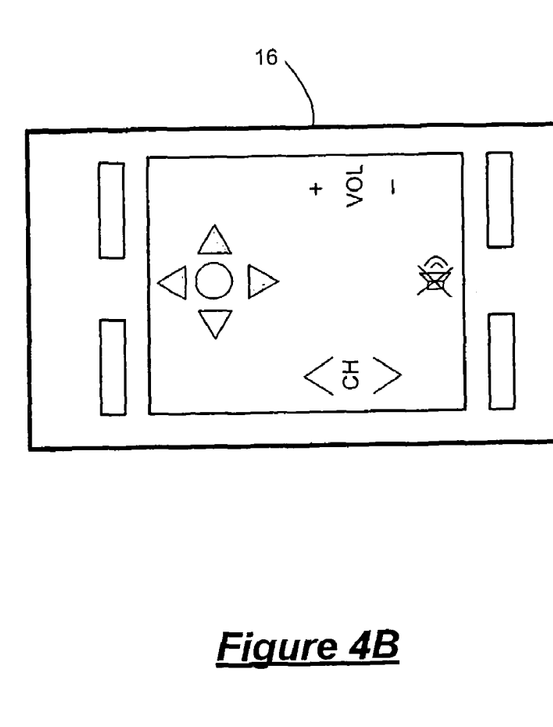
FIG. 4B is an illustration of the remote controller being held in a landscape position according to various aspects of the present disclosure.

Referring now to FIG. 3, a dataflow diagram illustrates a more detailed exemplary virtual keypad module 12. Various embodiments of the virtual keypad module 12 according to the present disclosure may include any number of sub-modules. As can be appreciated, the sub-modules shown in FIG. 3 may be combined and/or further partitioned to similarly perform text input. The data inputs 70, 72, 74, and 76 to the virtual keypad module 12 are received from the remote controller 16 (FIG. 1) and/or received from other modules (not shown) within the display device 14 (FIG. 1). In various embodiments, the virtual keypad module 12 includes an orientation recognition module 60, a hand position recognition module 62, a prediction module 64, a key input module 66, a key mapping module 67, and a GUI manager module 68. The orientation recognition module 60 determines an orientation of the remote controller 16 based on data received from the holding sensors 50 (FIG. 2B) and the accelerometer 48 (FIG. 2B). For example, the user can be holding the remote controller 16 (FIG. 2A) in a portrait position, as shown in FIG. 4A, or in a landscape position, as shown in FIG. 4B. In various embodiments, the orientation recognition module 60 determines the orientation by way of an Artificial Neural Network (ANN). The ANN can be trained by data indicating both landscape position conditions and portrait position conditions.

In one example, the orientation is determined by training an ANN with sensory data. The sensory data can comprise three-dimensional acceleration (accx, accy, accz) and an activation state of the n capacitive holding position sensors, which can signal that human skin is ever in proximity (1) or is not in proximity (0). These n+3 values are fed into a single perceptron or linear classifier to determine if the remote controller 16 (FIG. 2A) is horizontal or vertical. Perceptron coefficients can be trained on a database and hard-coded by a manufacturer. The hand position recognition module 62 determines a holding style of the remote controller 16 (FIG. 2A) based on data received from the holding sensors 50 (FIG. 2B) and the accelerometer 48 (FIG. 2B). For example, the sensory data 70, 72 can be used to determine whether the remote controller 16 (FIG. 2A) is held with one or two hands; and if it is held with one hand, whether it is held with the left or right hand. In various embodiments, the hand position recognition module 62 determines the holding style by way of an ANN. The ANN can be trained by data indicating right-hand conditions, left-hand conditions, and two hands conditions.

In one example, the hand position is determined similarly as discussed above. Mulitple perceptrons can be implemented for the more than one binary decisions (e.g., left hand, right hand, two handed).

As will be discussed in more detail below, the determination of the orientation and the holding style gives the virtual keypad module 12 the ability to accommodate the user by automatically adapting the text input methods and the look and feel of the GUI 18 (FIG. 1). Thus, the determination of the orientation and holding position allows the user to hold the remote controller 16 (FIG. 2A) in the most convenient way based on their personal preference and the actual conditions of use (e.g., standing, sitting, lying down). In the case of operating the remote controller 16 (FIG. 2A) in a dark room, the user can pick up and operate the remote controller 16 (FIG. 2A) without worrying about how they are holding it.

The hand position recognition module 62 can further perform user verification based on a combination of holding sensor data 70, accelerometer data 72, additional sensor information (such as an image of the palm of the user's hand), and/or bio-sensors. The data can be used to fully determine the identity of the user or, more broadly, infer the category to which the user belongs (e.g., left-handed, right-handed, kid, adult, elderly). User identification can be used, for example, for parental control, personalization, and profile switching. User categorization can be used to adapt the GUI 18 (FIG. 1).

Figure 5:
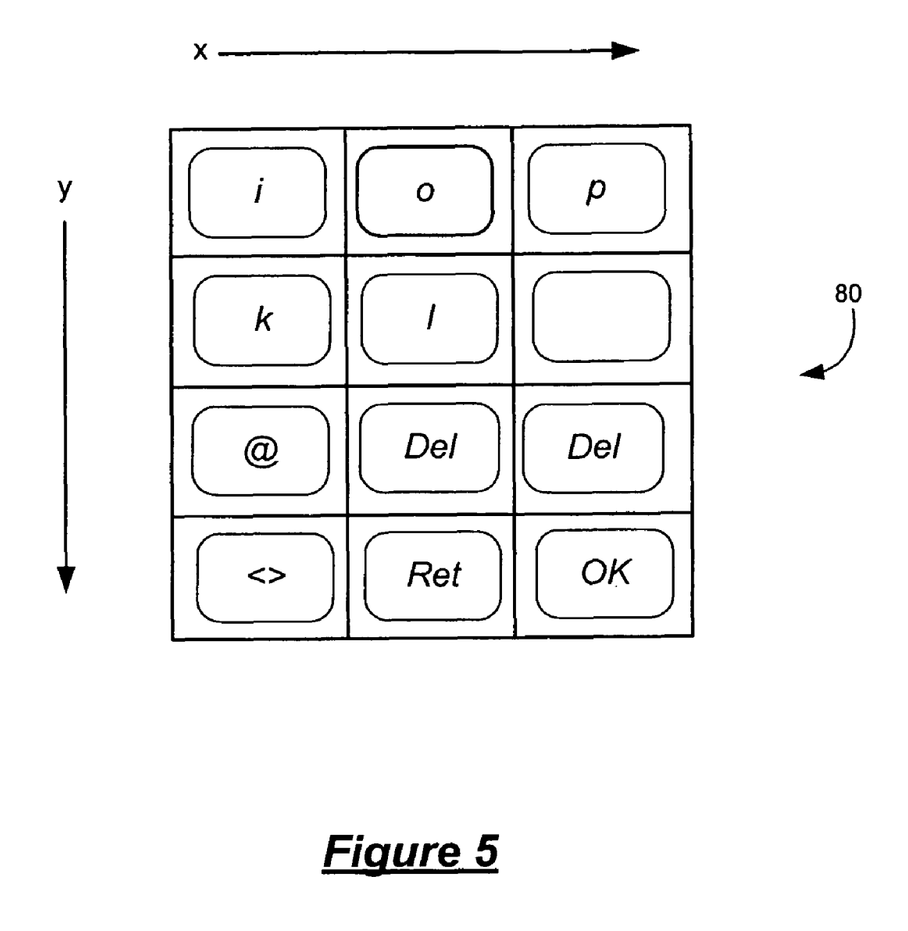
FIG. 5 is a table illustrating a mapping between XY coordinates of the touchpad and keys of a keypad.

The key mapping module 67 generates a map indicating an association between the coordinates or touch zones of the touchpad 22 (FIG. 2A) and the keys of the keypad and/or touchpad selection buttons. In various embodiments, the key mapping module 67 generates the map based on the orientation and hand position information determined from the orientation recognition module 60 and the hand position recognition module 62, respectively. For example, as shown in FIG. 5, the map can be a two dimensional (XY) table 80 that is used to assign a key of the keypad and/or a touchpad selection button to each coordinate of the touchpad 22 (FIG. 2A). As will be discussed in more detail below, the map can then be referenced by the key input module 66 to determine an action to be taken and can be referenced by the GUI manager module 68 to generate the GUI 18 (FIG. 1).

Referring back to FIG. 3, the key input module 66 processes touchpad sensor data 74 and/or the accelerometer data 72. In various embodiments, the key input module 66 interprets the touchpad sensor data 74 to be a coordinate or coordinates of the touchpad 22 (FIG. 2A) and determines what action to be taken based on the coordinate or coordinates. For example, the key input module 66 can receive the touchpad sensor data 74, determine a particular coordinate from the data 74, and reference the map generated by the key mapping module 67. Based on the entries in the map, the key input module 66, for example, can project that the user is hovering over a particular key of the keypad and, thus, entering a particular text.

In various embodiments, the key input module 66 interprets the accelerometer data 72 as an action to be taken. For example, the accelerometer data 72 can indicate if a user has lifted the remote controller 16 (FIG. 2A) quickly to select, for example, an uppercase mode. The accelerometer data 72 can indicate when a user has lowered the remote controller 16 (FIG. 2A) quickly to select, for example, a lowercase mode.

To enhance the precision and speed at which the text is entered, the prediction module 64 generates a prediction of which key and/or word the user is trying to select. The prediction module 64 generates the prediction based on the touchpad sensor data 74 and/or based on a determination of previous text entered. In various embodiments, the prediction module 64 performs one or more next key prediction methods, such as, for example, a language model method, a trajectory analysis method, a hand movement analysis method, a timing analysis method, and/or combinations thereof.

In one example, the prediction module 64 employs one or more language models known in the art to predict the next key based on previous text entered. For example, if the partial word 'pr' has been entered, the language model can predict that a vowel is likely to follow and that the letter 'r' will not be a possibility.

In another example, the prediction module 64 employs one or more language models to provide a list of reliable candidates of full words from partial word inputs. The full words can be selected by the user for auto-completion. For example, if the partial word 'Pan' has been entered, a list can be generated that includes 'Panasonic' and 'Pan-American.' Instead of typing the remaining characters, the user can simply select one of the full words.

In various embodiments, the language model can generate the word predictions based on words previously entered. For example, once selected, the words can be remembered and the language model can be adapted to favor the remembered words.

In yet another example, the trajectory analysis method can be performed to predict possible next keys based on future path estimation including directions and/or velocities of user's finger or thumb movement on the touchpad 22 (FIG. 2A) as indicated by the touchpad sensor data 74. For example, if the user first selects the 'k' key and the language model predicts that the next key can be one of 'l,' 'e,' or 'a,' the touchpad sensor data 74 can be evaluated to determine a direction the user is heading and velocity of the movement and, thus, eliminate one or more of the choices.

For example, the trajectory analysis method determines a coordinate of the key 'k' and subsequent finger movements. From that history of XY coordinates, the future path is determined. The path includes a tolerance to account for short-term prediction (more accurate) and longer-term prediction (lesss accurate). If the future path estimation is heading away from the coordinates of the predicted key, the choice is eliminated. For example, if the path is heading on an Up/Left diagonal line, then the keys 'e' and 'a' are eliminated and the key 'l' is selected as the predicted next key.

In another example, the hand movement analysis method can be performed using the holding style information provided by the hand position recognition module 62 and the predictions provided by the prediction module 64. The hand movement analysis method can evaluate whether the remote controller 16 (FIG. 2A) is held with two hands or one hand. If the remote controller 16 (FIG. 2A) is held by two hands and movement by a right hand or left hand is detected, then the choices that are associated with the non-moving hand would be eliminated.

For example, if the user first selects the 'k' key, the prediction module 64 predicts that the next key can be one of 'l,' 'e,' or 'a,' and movement is detected by the right hand, then the keys 'e' and 'a' are eliminated and the key 'l' is selected as the predicted next key.

In yet another example, the timing analysis method can be performed when the prediction module 64 is unable to predict the appropriate next key or word via any of the next key prediction methods. Such may be the case when the user is entering proper nouns, such as a last name or a password. The timing analysis method evaluates the time the user takes to move from one key to the next. If the user moves more slowly, it is more likely that a proper noun is being entered. The predictions are then ignored.

Figure 6:
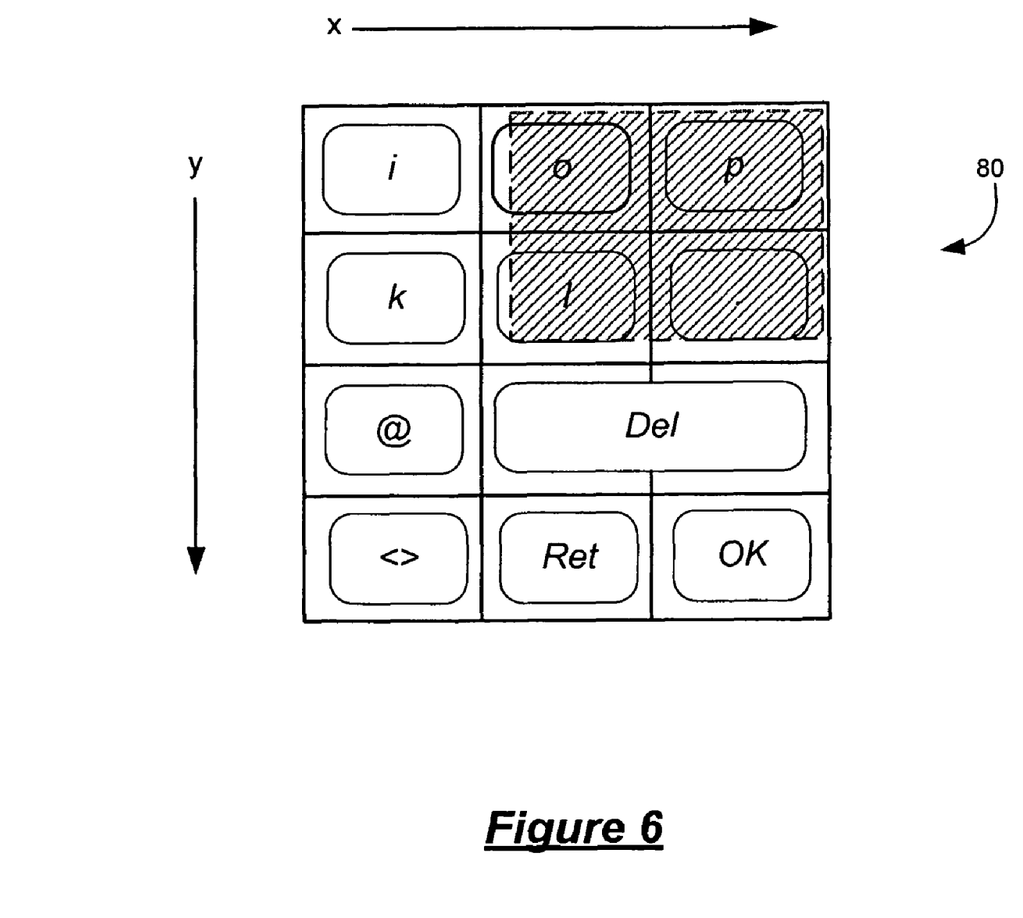
FIG. 6 is a table illustrating a remapping between the coordinates of the touchpad and the keys of a keypad.

Based on the predictions provided by the prediction module 64, the key mapping module 67 can remap the coordinates of the touchpad 22 (FIG. 2A) to the keys of the virtual keypad 20 (FIG. 1). In various embodiments, the coordinates that are associated with the predicted next key can be expanded to make the key more accessible. For example, as shown in FIG. 6, if the predicted next key is 'p,' the map can be adjusted such that the coordinates that were previously mapped to the keys 'o' or 'l' are now mapped to the key 'p.' Thus, if the user is actually hovering over the 'l' key, the 'p' key will be selected and entered if the user clicks on the touchpad 22 (FIG. 2A).

Referring back to FIG. 3, in various embodiments, the key mapping module 67 can remap the coordinates to the keys based on a relative speed of the user movement. For example, the key mapping module 67 can remap the coordinates such that the predicted key is mapped to a larger touch zone area when a faster movement is detected. The key mapping module 67 can maintain the original coordinates or remap to the original coordinates when slower movements are detected. The key mapping module 67 can scale the area between the larger area and the original area when a movement that is not fast or slow is detected.

The GUI manager module 68 generates GUI data 76 for displaying the GUI 18. The GUI 18 provides visual feedback to the user indicating the actions they have performed with the remote controller 16 (FIG. 2A). As shown in the exemplary GUIs 18 of FIGS. 7 through 10, the GUI 18 can include the virtual keypad 20, including multiple alphanumeric keys 90, one or more selection buttons 92, a selection list 94, a text display box 96, a title bar 98, and/or combinations thereof.

Figure 7:
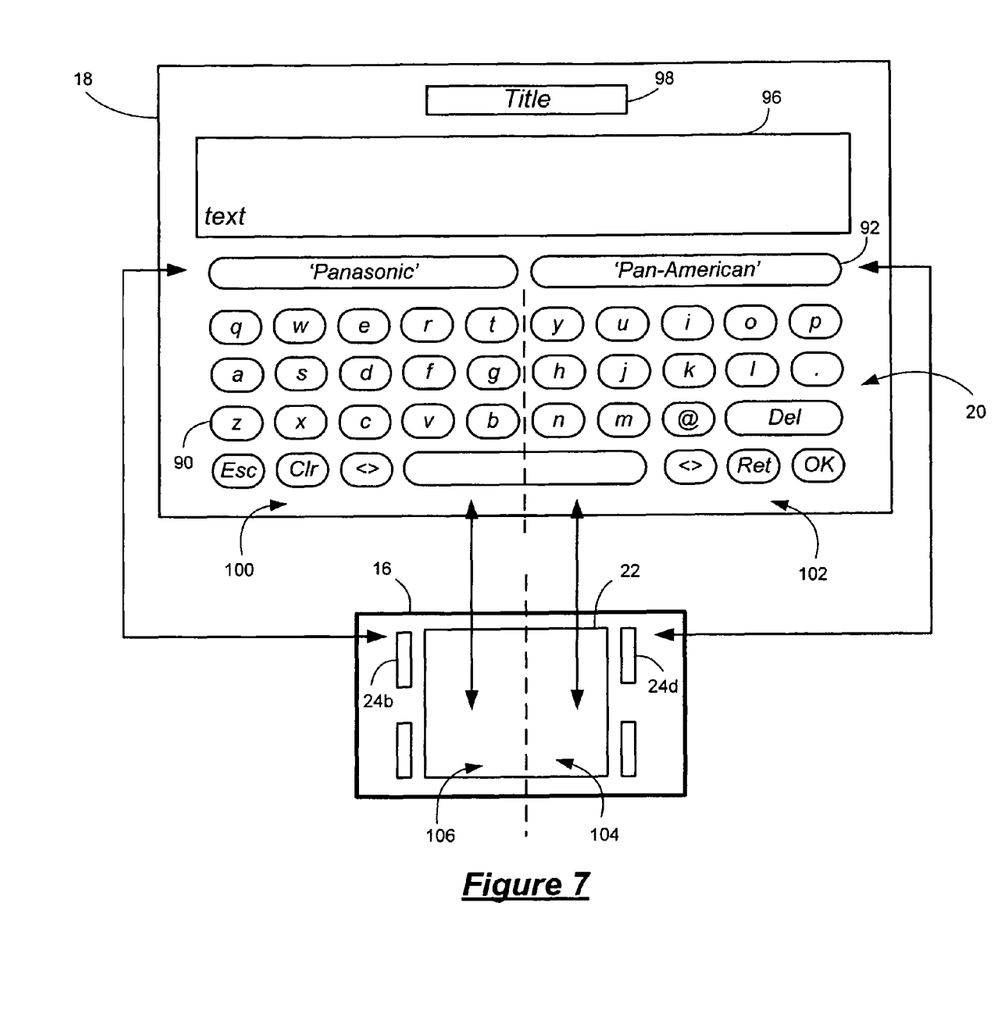
FIG. 7 is an illustration of a first embodiment of a virtual keypad graphical user interface according to various aspects of the present disclosure.

In various embodiments, the GUI manager module 68 displays the virtual keypad 20 based on the holding position and the orientation determined by the hand position recognition module 62 and the orientation recognition module 60, respectively. For example, as shown in FIG. 7, if two hands are used to hold the remote controller 16 (FIG. 2A) in the landscape position, the virtual keypad 20 and the touchpad 22 can be divided into two zones 100, 102 (e.g., left and right). The keys in the right zone 102 can be associated with a first zone 104 of the touchpad 22, and the keys in the left zone 100 can be associated with a second zone 106 of the touchpad 22. The user can select a key 90 in the right zone 102 with a right thumb or finger, and the user can select a key 90 in the left zone 100 with a left thumb or finger. The keys 90 in each zone 100, 102 can be distinguished by a particular color or shading of the keys 90 so that the user can determine which keys 90 can be selected with which thumb or finger. This will allow for a natural text input, similar to the experience when entering text on classic keyboards.

In this example, selection of a predicted word (auto-completion) can be made through the display of the two most probable words (e.g., 'Panasonic,' 'Pan America'). For example, the two words can be displayed on selection buttons 92. The user can select the selection buttons 92 by pushing soft keys 24b, 24d located on the top side of the remote controller 16 with the index fingers, or by dragging the finger or thumb to a dedicated zone located at a designated location of the touchpad 22.

In various embodiments, when the touchpad 22 and the virtual keypad 20 are divided into two zones, the mapping of the coordinates can provide for an overlap between the two areas. For example, the letter 'g' in left keyboard area can be selected by the touchpad in the first zone, as well as be selected by the touchpad 22 in the second zone 106. The overlap keys can be identified on the GUI 18 by shading or color.

Figure 8A:
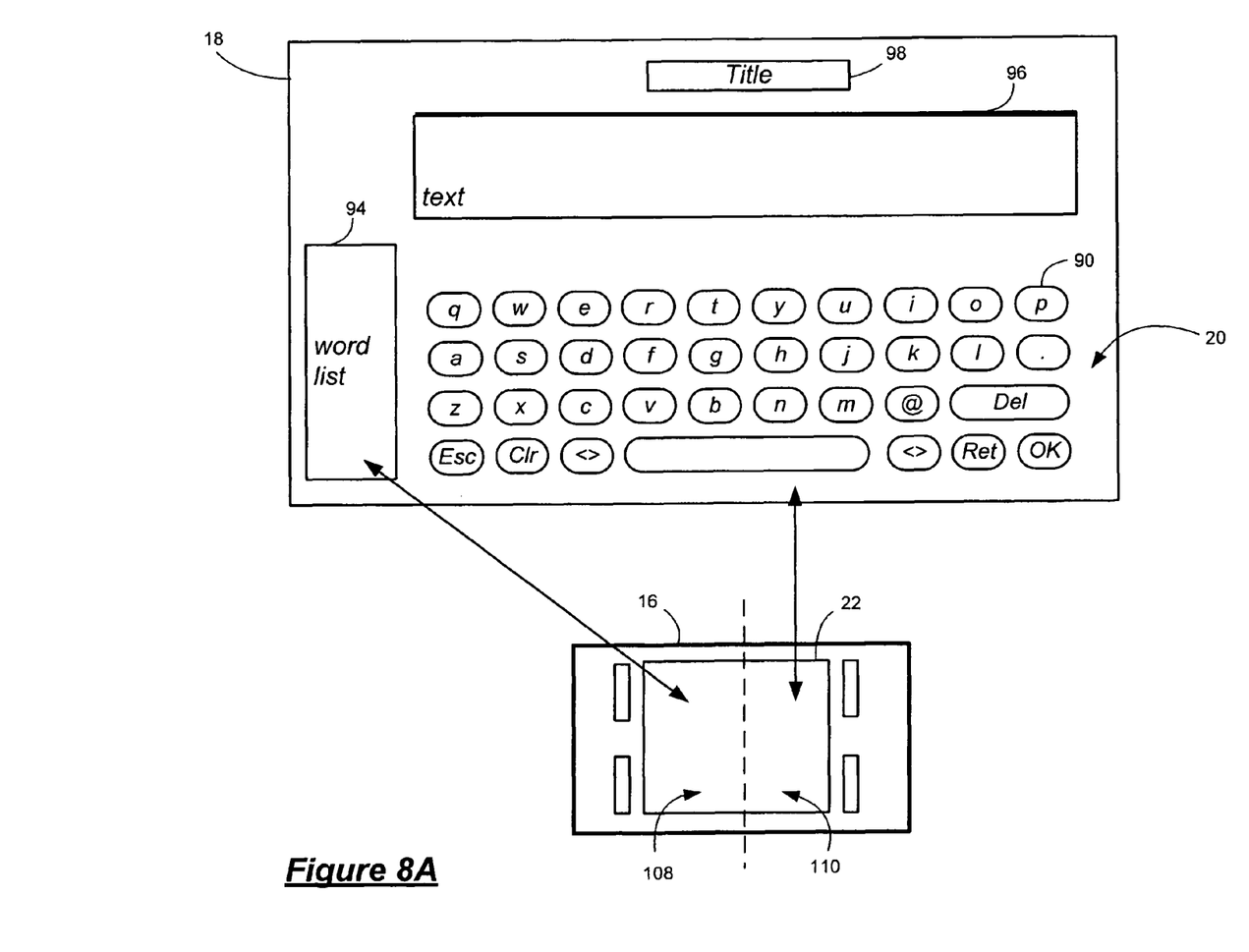
FIG. 8A is an illustration of a second embodiment of a virtual keypad graphical user interface according to various aspects of the present disclosure.
Figure 8B:
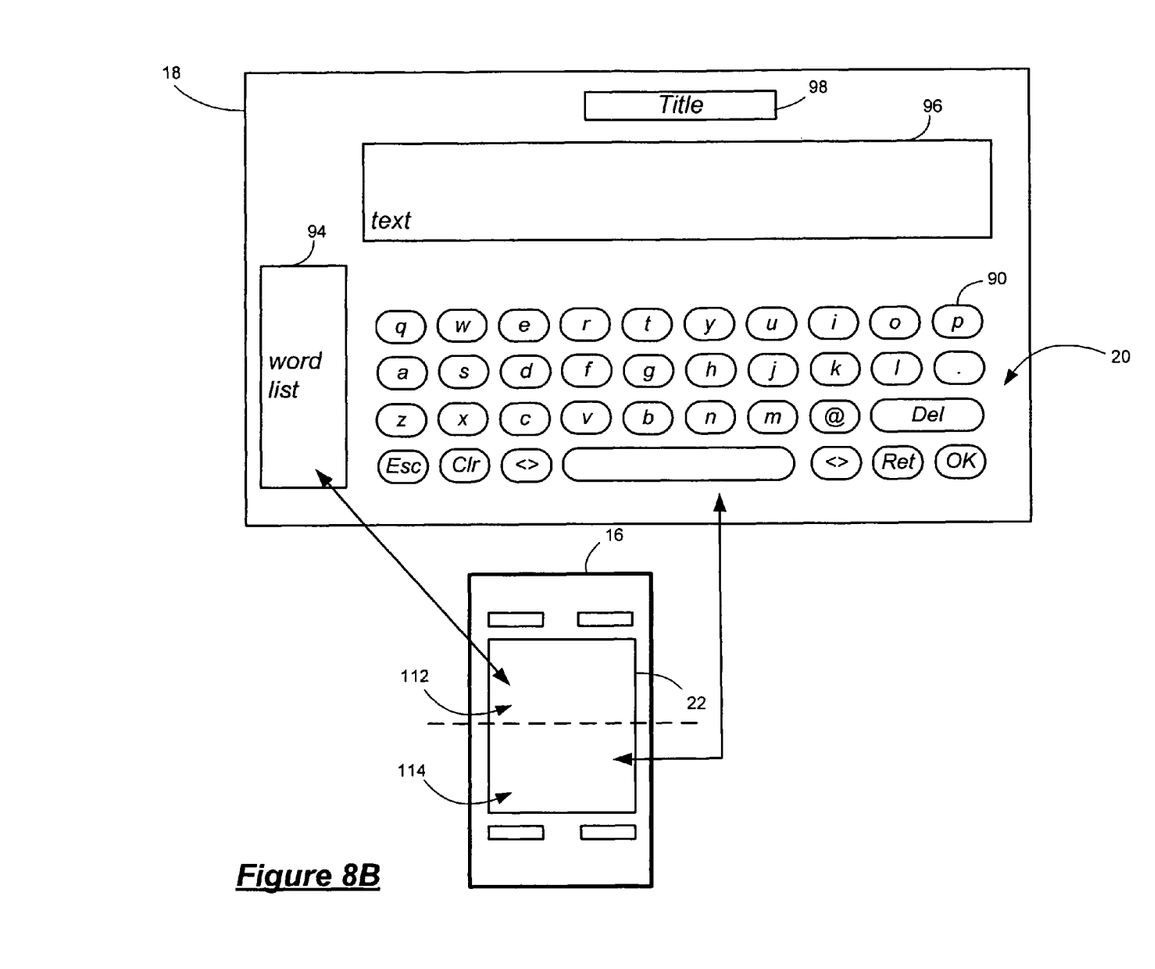
FIG. 8B is an illustration of a third embodiment of a virtual keypad graphical user interface according to various aspects of the present disclosure.

Referring now to FIGS. 8A and 8B, in another example, if two hands are used to hold the remote controller in the landscape position, the touchpad 22 can be divided into two zones 108, 110 or 112, 114. The virtual keypad 20, however, is not divided. A first zone 110 or 114 of the touchpad 22 can be associated with the entire virtual keypad 20, and can be referred to as the "Key-Entry Zone." The second zone 108 or 112 of the touchpad 22 can be associated with the auto-completion buttons 92 (FIG. 7) or selection lists 94, and can be referred to as the "Auto-Completion Zone." The auto-completion buttons 92 or selection lists 94 can be displayed when the user touches the touchpad 22 in the "Auto-Completion Zone." The user interface can include a small visual notification to signal the availability and status of auto-completion words. This way the user will not be bothered with auto-completion unless he decides to use it.

In various embodiments, the zones 108, 110 or 112,114 of the touchpad 22 can be configured based on an identification of the user. For example, in the case of a right-handed user, the right zone 110 can be associated with the "Key-Entry Zone" used most often and the left zone can be associated with the "Auto-Completion Zone." Similarly, for a left-handed user, the left zone 108 can be associated with the "Key-Entry Zone" used most often and the right zone can be associated with the "Auto-Completion Zone."

Figure 9:
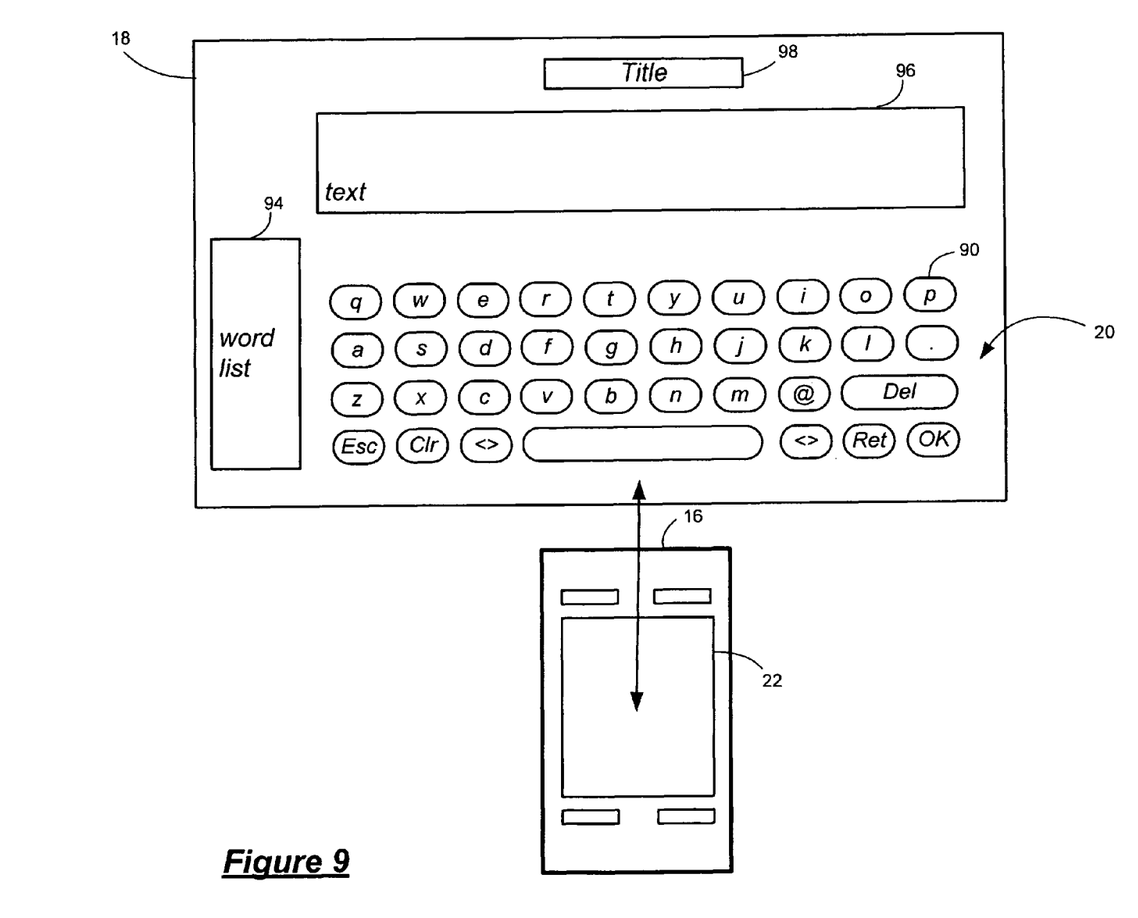
FIG. 9 is an illustration of a fourth embodiment of a virtual keypad graphical user interface according to various aspects of the present disclosure.

Referring now to FIG. 9, in yet another example, if one hand is used to hold the remote controller 16 in the portrait position, the touchpad 22 is divided into zones. The virtual keypad 20, however, is not divided into zones. Only one zone of the touchpad 22 is used by the user at all times. The user will be able to address the entire virtual keypad 20 from the entire touchpad 22. Such touchpad 22 will principally function as the "Key-Entry Zone." If auto-completion is needed, the user can switch the touchpad to the "Auto-completion Zone" by using a simple gesture. Such gesture can include, but is not limited to, moving the thumb or finger to a specific area of the touchpad 22 (for instance lower right), or sliding the finger or thumb along the touchpad 22 quickly from right to left.

In any of the examples shown in FIGS. 7 through 9, the user can select a key 90 by dragging the thumb or finger on the touchpad 22. In response to the movement, one or more on-screen pointers (such as, for example, a cursor, or an illustration of a thumb or finger) slides to a target key 90. The on-screen pointers can be displayed according to the hand position (e.g., left hand only, right hand only, or both hands). The key 90 can be selected by clicking the clickable touchpad 22 and/or upon release. When displaying a thumb or finger as the pointer, a different thumb or finger posture can be used to indicate a thumb or finger press as opposed to a thumb or finger that is dragged on the touchpad surface. The selected character associated with the key will be displayed in the text display box 96.

Figure 10:
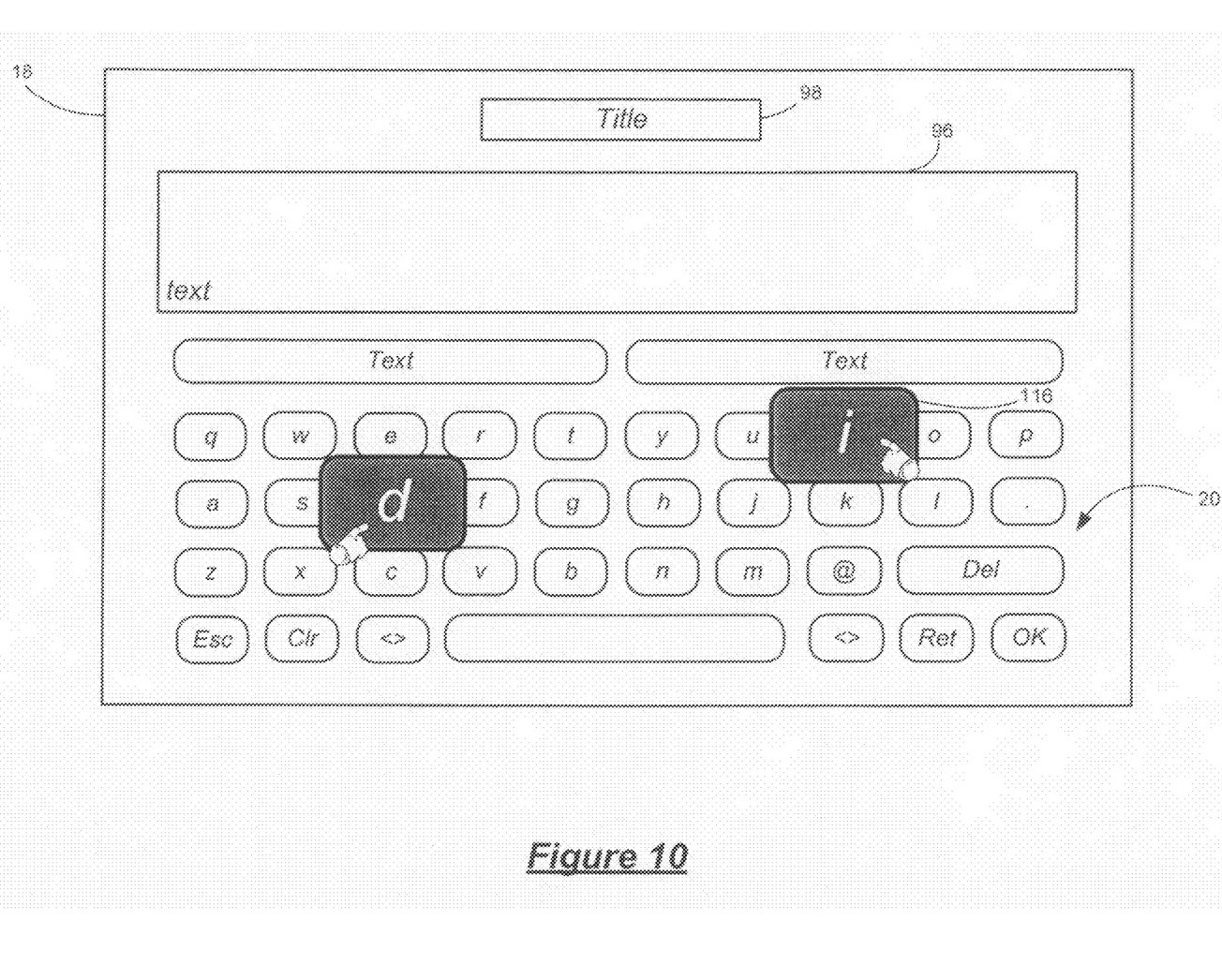
FIG. 10 is an illustration of a fifth embodiment of a virtual keypad graphical user interface according to various aspects of the present disclosure.

Referring now to FIG. 10, in various embodiments, the GUI manager module 68 displays the keys 90 of the virtual keypad 20 based on the predicted next key and the remapping of the coordinates performed by the key mapping module 67 (FIG. 3). For example, by knowing the next likely key, the GUI manager module 68 (FIG. 3) can highlight and/or enlarge the most likely key 116 based on the mapping of the coordinates. However, when the user is not moving the cursor quickly or the user hovers over a given coordinate, the highlighted and/or enlarged key 116 is remapped to the original coordinates of the touchpad 22 and the highlighted and/or enlarged key can be resized back to the original size.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A virtual keypad system for inputting text, comprising:
a remote controller including at least one touchpad incorporated therein and divided into a plurality of touch zones;
a display device in data communication with the remote controller and operable to display a user interface including a keypad on which each of the keys is mapped to a corresponding one of mutually different areas in the touch zones of the touchpad;
a prediction module performing one or more key prediction methods in response to an operator pressing a given one of the touch zones to select a particular character, the one or more key prediction methods including predicting one or more next plausible keys; and
a key mapping module remapping the areas in the touch zones of the touchpad to the keys of the keypad, based on the one or more next plausible keys,
wherein the touchpad is divided into two operating zones and wherein the key mapping module maps a first subset of keys of the keypad to a first operating zone of the touchpad and maps a second subset of keys of the keypad to a second operating zone of the touchpad,
wherein the first operating zone corresponds to a right zone of the touchpad and wherein the second operating zone corresponds to a left zone of the touchpad, and
wherein the remote controller further includes:
an accelerometer obtaining data indicating a position of the remote controller;
a holding sensor obtaining data indicating a portion that is of the remote controller and being touched by a user;
an orientation recognition module determining an orientation of the remote controller, based on the data from the holding sensor and the data from the accelerometer; and
a hand recognition module recognizing a style of holding the remote controller, based on the data from the holding sensor and the data from the accelerometer, and
in the case where the orientation recognition module and the hand recognition module recognize that the remote controller is held horizontally with both hands of the user, the first operating zone is mapped to the right zone of the touchpad, and the second operating zone is mapped to the left zone of the touchpad.

* * * * *